US009263739B2

(12) United States Patent
Jeong et al.

(10) Patent No.: US 9,263,739 B2
(45) Date of Patent: Feb. 16, 2016

(54) COMPOSITE ANODE ACTIVE MATERIAL, METHOD OF PREPARING THE SAME, AND LITHIUM BATTERY INCLUDING THE COMPOSITE ANODE ACTIVE MATERIAL

(71) Applicant: Samsung SDI Co., Ltd., Yongin, Gyeonggi-Do (KR)

(72) Inventors: Joa-Yong Jeong, Yongin (KR); Ji-Heon Ryu, Siheung-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 158 days.

(21) Appl. No.: 13/859,537

(22) Filed: Apr. 9, 2013

(65) Prior Publication Data
US 2014/0057172 A1    Feb. 27, 2014

(30) Foreign Application Priority Data
Aug. 21, 2012   (KR) .................. 10-2012-0091471

(51) Int. Cl.
*H01M 4/36* (2006.01)
*H01M 4/131* (2010.01)
*H01M 4/136* (2010.01)
*H01M 4/485* (2010.01)
*H01M 4/58* (2010.01)
*C01G 23/00* (2006.01)
*H01M 10/052* (2010.01)

(52) U.S. Cl.
CPC .............. *H01M 4/366* (2013.01); *C01G 23/003* (2013.01); *C01G 23/005* (2013.01); *H01M 4/131* (2013.01); *H01M 4/136* (2013.01); *H01M 4/485* (2013.01); *H01M 4/58* (2013.01); *C01P 2004/03* (2013.01); *C01P 2004/61* (2013.01); *C01P 2004/80* (2013.01); *C01P 2006/40* (2013.01); *H01M 10/052* (2013.01); *Y02E 60/122* (2013.01)

(58) Field of Classification Search
CPC ..... H01M 4/366; H01M 4/131; H01M 4/485; H01M 4/58; H01M 4/136; H01M 4/0471; H01M 4/48; H01M 4/1391
See application file for complete search history.

(56) References Cited

U.S. PATENT DOCUMENTS

| 2003/0180511 | A1* | 9/2003 | Yukinobu et al. ............ 428/209 |
| 2008/0078594 | A1  | 4/2008 | Harada et al. |
| 2010/0055568 | A1  | 3/2010 | Kim et al. |
| 2010/0143791 | A1* | 6/2010 | Park et al. ..................... 429/164 |
| 2010/0224824 | A1  | 9/2010 | Gorshkov |
| 2011/0269025 | A1* | 11/2011 | Sun et al. .................. 429/231.5 |
| 2012/0208340 | A1* | 8/2012 | Song et al. .................... 438/386 |

FOREIGN PATENT DOCUMENTS

| JP | 2011-165372 A | 8/2011 |
| KR | 10-2008-0023831 A | 3/2008 |
| KR | 10-2008-0029878 A | 4/2008 |
| KR | 10-2008-0112809 A | 12/2008 |
| KR | 10-2010-0028356 A | 3/2010 |
| KR | 10-2010-0083730 A | 7/2010 |
| KR | 10-2012-0004987 A | 1/2012 |
| KR | 10-2012-0005648 A | 1/2012 |

* cited by examiner

*Primary Examiner* — Muhammad Siddiquee
(74) *Attorney, Agent, or Firm* — Knobbe Martens Olson & Bear, LLP

(57) ABSTRACT

In an aspect, a composite anode active material including lithium titanium oxide particles; and a TiN, and TiN a method of preparing the composite anode active material, and a lithium battery including the composite anode active material is provided.

13 Claims, 7 Drawing Sheets

COMPOSITE ANODE ACTIVE MATERIAL, METHOD OF PREPARING THE SAME, AND LITHIUM BATTERY INCLUDING THE COMPOSITE ANODE ACTIVE MATERIAL

CROSS-REFERENCE TO RELATED APPLICATION

This application claims the benefit of Korean Patent Application No. 10-2012-0091471, filed on Aug. 21, 2012 in the Korean Intellectual Property Office, the disclosure of which is incorporated in its entirety herein by reference.

BACKGROUND

1. Field

One or more embodiments of the present disclosure relate to a composite anode active material, a method of preparing the same, and a lithium battery including the composite anode active material.

2. Description of the Related Technology

Small, light-weight lithium batteries with high charging and discharging capacities are available use in portable electronic devices for information communications, such as personal data assistants (PDAs), mobile phones, and laptop computers, or electric bicycles, electric vehicles, and the like.

Lithium batteries such as lithium ion secondary batteries, may be manufactured using materials for a cathode and an anode that allow intercalation or deintercalation of lithium ions, and an organic electrolyte solution or polymer electrolyte solution disposed between the cathode and the anode.

Lithium ion secondary batteries generate electrical energy through oxidation and reduction reactions that take place during intercalation and deintercalation of lithium ions in the anode and cathode.

Lithium ion secondary batteries may use lithium metal as an anode active material, but it may form dendrites causing a short circuit and thus a high risk of failure of the battery. To overcome these shortcomings, carbonaceous materials have been often used as anode materials instead of lithium metals.

Crystalline carbonaceous materials such as natural graphite and artificial graphite, and amorphous carbonaceous materials such as soft carbon and hard carbon are available as carbonaceous materials. Amorphous carbonaceous materials may have high capacities; however, adversely are highly likely to be irreversible altered in charging and discharging cycles. For this reason, graphite as crystalline carbonaceous material is currently in wide use.

Recently, lithium titanium oxide has been investigated as an anode active material for lithium ion secondary batteries. One such material is a lithium titanium oxide ($Li_4Ti_5O_{12}$) having a higher operating voltage of about 1.5V relative to carbonaceous materials and a theoretical capacity of about 175 mAh/g which is only half the capacity relative to graphite as a crystalline carbonaceous material. Including lithium titanium oxide ($Li_4Ti_5O_{12}$) as an anode active material for lithium ion secondary batteries ensures a high charging and discharging rate with nearly zero irreversible reaction, and provides high stability of the battery because it produces very low reaction heat. Although $Li_4Ti_5O_{12}$ has a higher theoretical density of about 3.5 cc/g relative to carbonaceous materials having a theoretical density of about 2 g/cc, it is similar in capacity per volume as carbonaceous materials.

Furthermore, with the increasing use of lithium ion secondary batteries, as power sources for portable devices, electric vehicles and as large-capacity power storage devices, there is a demand for a material affording a high charging and discharging rate and long lifetime characteristics with a similar capacity per volume as carbonaceous materials, as an anode active material for lithium batteries.

SUMMARY

One or more embodiments of the present disclosure include a composite anode active material with improved charging/discharging rate characteristics.

One or more embodiments of the present disclosure include a method of preparing a composite anode active material with improved charging/discharging rate characteristics.

Additional aspects will be set forth in part in the description which follows and, in part, will be apparent from the description, or may be learned by practice of the presented embodiments.

According to one or more embodiments of the present disclosure, a composite anode active material including lithium titanium oxide particles; and a TiN layer on a surface of the lithium titanium oxide particles is provided.

In some embodiments, the TiN layer may have a thickness of from about 1 nm to about 20 nm.

In some embodiments, the TiN layer may include substantially rectangular TiN particles.

In some embodiments, the TiN particles may include substantially hexahedral or octahedral particles.

In some embodiments, the lithium titanium oxide particles may have a spinel structure.

In some embodiments, the lithium titanium oxide particles may be represented by Formula 1 below:

$$Li_{4+x}Ti_{5-y}M_zO_{12-n}$$ 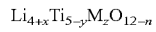 Formula 1 wherein, in Formula 1 above, −0.2≤x≤0.2; −0.3≤y≤0.3; 0≤z≤0.3; −0.3≤n≤0.3; and M may be selected from the group consisting of lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

Some embodiments provide a method of preparing a composite anode active material including: forming lithium titanium oxide particles; mixing the lithium titanium oxide particles with an amount of urea-based compound to obtain a mixture; and thermally treating the mixture to yield the composite anode active material with a TiN layer on a surface of the lithium titanium oxide particles at a temperature and at a pressure.

In some embodiments, the forming of the lithium titanium oxide particles may include: mixing a lithium source and a titanium source to obtain a precursor mixture; and thermally treating the precursor mixture.

In some embodiments for the obtaining of the mixture, the urea-based compound may include urea, thiourea, or a mixture thereof.

In some embodiments for the obtaining of the mixture, an amount of the urea-based compound mixed with the lithium titanium oxide particles may be from about 5 parts to about 60 parts by weight based on 100 parts by weight of the lithium titanium oxide particles.

In some embodiments, the yielding of the composite anode active material may include thermally treating the mixture at a temperature of from about 600° C. to about 900° C.

In some embodiments for the yielding of the composite anode active material, the thermal treating may be performed at a pressure of about 0.1 MPa to about 5 MPa.

Some embodiments provide a lithium battery includes: a cathode; an anode including the above-described composite anode active material; and an electrolyte disposed between the cathode and the anode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
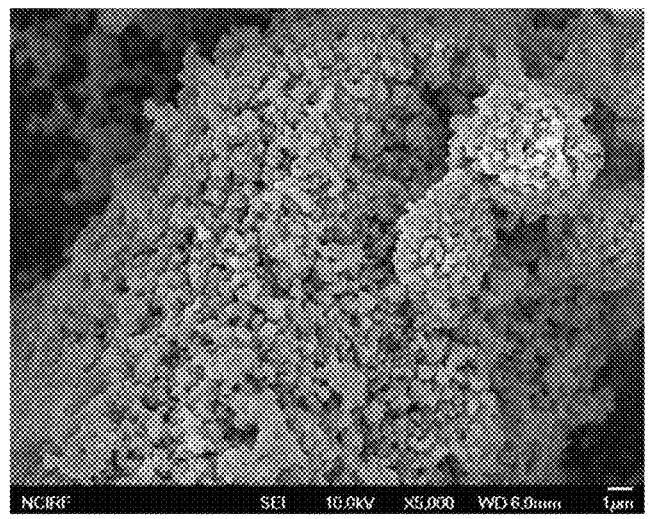
FIGS. 1A and 1B are scanning electron microscopic (SEM) images of a composite anode active material prepared in Example 1 at a magnification of ×5,000 and ×20,000, respectively.

Reference will now be made in detail to embodiments of a composite anode active material, a method of preparing the same, and a lithium battery including the composite anode active material, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Some embodiments provide a composite anode active material including a lithium titanium oxide particles; and a TiN layer on a surface of the lithium titanium particles. In some embodiments, the composite anode active material may include a lithium titanium oxide core and a TiN layer on a surface of the lithium titanium oxide core.

Unlike carbonaceous materials, lithium titanium oxide does not form solid electrolyte interphase from a side reaction with electrolyte, and thus is desirable in term of efficiency, though it may be poor in ion conductivity and electron conductivity.

Lithium titanium oxide in the form of nanoparticles may reduce the time it takes for lithium ions to diffuse in solid-phase lithium titanium oxide particles, thereby improving ion conductivity and electron conductivity of the lithium titanium oxide.

However, nano-sized lithium titanium oxide particles combined together with carbon black to manufacture an electrode may have reduced energy density, thus making is difficult to manufacture an electrode even though the electron conductivity may be improved.

In some embodiments, the composite anode active material may have a TiN layer affording improved electrical conductivity on the surface of a lithium titanium oxide core, and thus may improve charging and discharging rate characteristics when used in a lithium battery.

In some embodiments, the TiN layer may have a thickness of from about 1 nm to about 20 nm. For example, the TiN layer may have a thickness of from about 1 nm to about 10 nm, and in some embodiments, may have a thickness of from about 2 nm to about 8 nm.

Due to a strong chemical interaction between the Ti element in the lithium titanium oxide core and the N (nitrogen) element in the TiN layer on the core surface, the TiN layer of the composite anode active material may have improved electrical conductivity with a thickness within the above-defined ranges.

In some embodiments, the TiN layer may include rectangular TiN particles. In this regard, referring to FIGS. 1A and 1B, which are scanning electron microscopic (SEM) images of a composite anode active material according to an embodiment, at a magnification of 5,000 and 20,000, respectively, a TiN layer of the composite anode active material is found to include rectangular TiN particles.

In some embodiments, the TiN particles may include hexahedral or octahedral structure. For example, the TiN particles may have a hexahedral or octahedral rock-salt structure. In this regard, referring to FIGS. 2A and 2C, which are transmission electron microscopic (TEM) images of a composite anode active material according to an embodiment of the present invention at a magnification of ×80,000 and ×4,000,000, a TiN particles found to have hexahedral or octahedral structure.

In some embodiments, the TiN particles may have an average particle diameter of from about 20 nm to about 250 nm. For example, the TiN particles may have an average particle diameter of from about 50 nm to about 200 nm, and in some other embodiments, of from about 50 nm to about 150 nm. The average particle diameter of the TiN particles within these ranges may be established from the SEM images of the composite anode active material of Example 1 in FIGS. 1A and 1B at ×5,000 and ×20,000, respectively. For example, the average particle diameter of the primary particles may be obtained from the largest diameter of each of about fifty particles arbitrarily selected from among the TiN particles on the SEM images.

In some embodiments, the lithium titanium oxide particles may have a spinel structure.

In some embodiments, the lithium titanium oxide particles with a spinel structure may improve cycle stability and thermal load capacity of a lithium battery including the core, thus improving operation reliability.

In some embodiments, the lithium titanium oxide particles may be represented by Formula 1 below.

$$Li_{4+x}Ti_{5-y}M_zO_{12-n}$$  Formula 1 wherein, in Formula 1, $-0.2 \le x \le 0.2$; $-0.3 \le y \le 0.3$; $0 \le z \le 0.3$; $-0.3 \le n \le 0.3$; and M may be selected from the group consisting of lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

In some embodiments, the lithium titanium oxide core can be secondary particles agglomerated from primary particles. This may be established from the SEM image of the composite anode active material of FIG. 1C magnified by ×5,000.

In some embodiments, the secondary particles may have an average particle diameter of from about 1 μm to about 30 μm. For example, the secondary particles may have an average particle diameter of from about 2 μm to about 20 μm and in some embodiments, of from about 5 μm to about 15 μm.

These average particle diameter ranges of the secondary particles may be established from the SEM image of the composite anode active materials of Comparative Example 1 in FIG. 1 magnified by ×5,000.

When the secondary particles of the lithium titanium oxide are within these average particle diameter ranges, the time it takes for lithium ions to diffuse in the primary particles may be reduced.

Some embodiments provide a method of preparing the composite anode active material including forming a lithium titanium oxide core; mixing the lithium titanium oxide core with a urea-based compound to obtain a mixture; and thermally-treating the mixture to yield the composite anode active material with a TiN layer on a surface of the lithium titanium oxide core.

In some embodiments, the forming of the lithium titanium oxide core may include: mixing a lithium source and a titanium source to obtain a precursor mixture; and thermally treating the precursor mixture.

As a first operation for forming the lithium titanium oxide core, a lithium source and a titanium source may be mixed together to obtain a precursor mixture.

In some embodiments, the lithium source to obtain a precursor mixture may include at least one selected from the group consisting of $Li_2CO_3$, LiCl, $LiNO_3$, $LiC_2O_4$, $(Li)_3PO_4$, LiOH, $Li_2SO_4$, and $CH_3COOLi$. In some other embodiments, the lithium source to obtain a precursor mixture may be $Li_2CO_3$, LiCl, or $LiNO_3$.

In some embodiments, the titanium source to obtain a precursor mixture may include at least one selected from the group consisting of rutile $TiO_2$, anatase $TiO_2$, titanium oxide hydrate ($TiO_2 \cdot H_2O$), and $TiO(OH)_2$. For example, the titanium source may be anatase $TiO_2$.

In some embodiments, the mixing of a lithium source and a titanium source to obtain a precursor mixture may include milling the lithium source and the titanium source. In some embodiments, the milling may be either dry milling or wet milling. In some embodiments, the milling method may be ball milling or bead milling, but is not limited thereto. Any milling method available in the art may be used.

After the mixing of a lithium source and a titanium source to obtain a precursor mixture, the precursor mixture may be thermally treated to yield the lithium titanium oxide core.

In some embodiments, the thermally treating of the precursor mixture may be performed at a temperature of from about 800° C. to about 900° C. for about 30 minutes to 24 hours. When the precursor mixture is thermally treated in these conditions, the resulting lithium titanium oxide core may have improved crystallinity.

In some embodiments, the lithium titanium oxide core may be mixed with a urea-based compound to obtain a mixture.

In some embodiments for the obtaining of the mixture, the urea-based compound may include urea, thiourea, or a mixture thereof. When the lithium titanium oxide core is mixed with the urea-based compound, instead of ammonia ($NH_3$), it may be facilitated to yield the composite anode active material at reduced costs, and durability of the reactor used in yielding the composite anode active material may be ensured.

In some embodiments for the obtaining of the mixture, an amount of the urea-based compound mixed with the lithium titanium oxide core may be from about 5 parts to about 60 parts by weight based on 100 parts by weight of the lithium titanium oxide particles. In the obtaining of the mixture, the amount of the urea-based compound mixed with the lithium titanium oxide particles may be from about 10 parts to about 50 parts by weight based on 100 parts by weight of the lithium titanium oxide particles.

When the urea-based compound is mixed within these amount ranges to prepare the composite anode active material, a lithium battery including the composite anode active material may have improved charging and discharging rate characteristics.

In some embodiments, the urea-based compound mixture is thermally treated to yield the composite anode active material with the TiN layer on the surface of the lithium titanium oxide particles.

In some embodiments for the yielding of the composite anode active material, the mixture may be thermally treated at a temperature of from about 600° C. to about 900° C. for about 1 minute to about 1 hour.

In some embodiments for the yielding of the composite anode active material, the thermal treating may be performed at a pressure of about 0.1 MPa to about 5 MPa. When the mixture is thermally treated within this pressure range, ammonia gas generated from decomposition of the urea-based compound is allowed to react sufficiently with the lithium titanium oxide. In some embodiments, a pressurized reactor, such as an autogenic reactor may be used to thermally treat the mixture therein.

Some embodiments provide a lithium battery including a cathode; an anode including a composite anode active material as disclosed and described herein: and an electrolyte disposed between the cathode and the anode.

Figure 3:
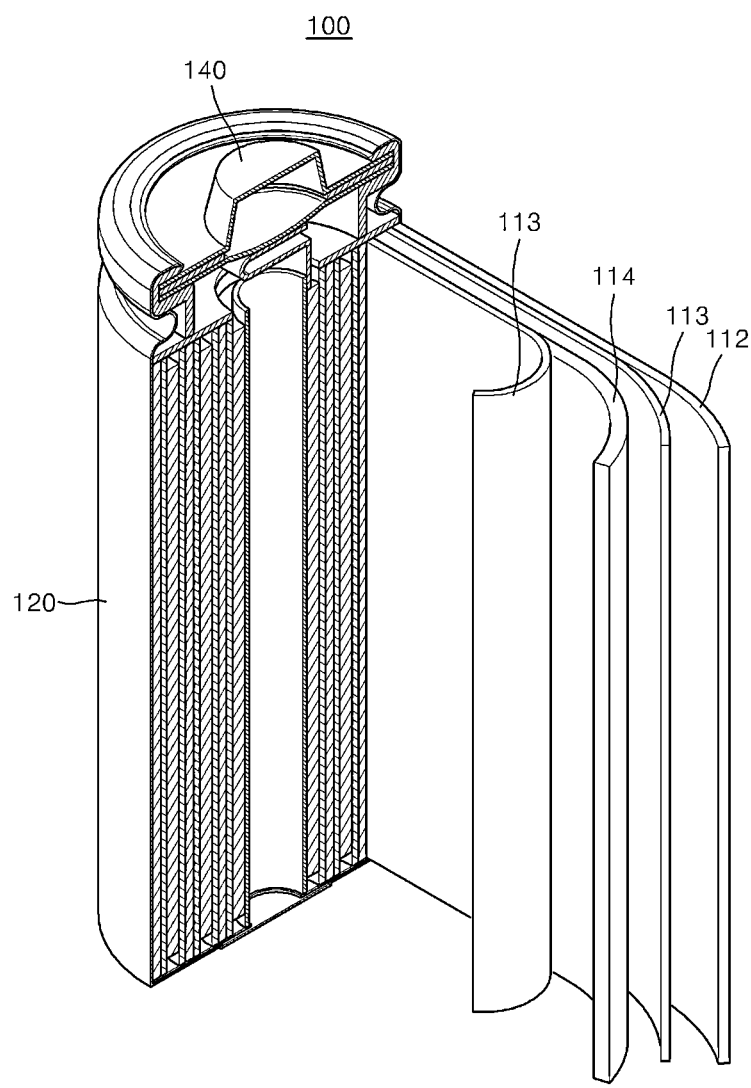
FIG. 3 is an exploded perspective view of a structure of a lithium battery according to an embodiment of the present invention.

FIG. 3 is an exploded perspective view of a structure of a lithium battery 100 according to an embodiment of the present invention.

Although the lithium secondary 100 illustrated in FIG. 3 is cylindrical, the present embodiments are not limited thereto, and lithium secondary batteries may be of a rectangular type or a pouch type, for example.

Lithium secondary batteries may be classified as either lithium ion batteries, lithium ion polymer batteries, or lithium polymer batteries, according to the type of separator and/or electrolyte included therein. In addition, lithium batteries may be classified as either cylindrical type, rectangular type, coin type, or pouch type, according to the shape thereof. Lithium batteries may also be classified as either bulk type or thin film type, according to the size thereof. Lithium secondary batteries according to embodiments of the present disclosure may have any appropriate shapes.

Referring to FIG. 3, the lithium secondary battery 100 in cylindrical form includes an anode 112, a cathode 114, a separator 113 disposed between the anode 112 and the cathode 114, and an electrolyte (not shown) impregnated into the anode 112, the cathode 114, and the separator 113, a battery case 120, and a sealing member 140 sealing the battery case 120. In some embodiments, the lithium secondary battery 100 may be manufactured by sequentially stacking the anode 112, the cathode 114, and the separator 113 upon one another to form a stack, rolling the stack in a spiral form, and accommodating the rolled up stack in the battery case 120.

In some embodiments, the anode 112 may include a current collector and a cathode active material layer disposed on the current collector.

In some embodiments, the current collector for the anode 112 may be a Cu current collector, but is not limited thereto. Examples of the current collector include, but are not limited to stainless steel, aluminum, nickel, titanium, thermally-treated carbon, copper or stainless steel that is surface-treated with carbon, nickel, titanium, or silver, and aluminum-cadmium alloys. In some embodiments, the anode current collector may be processed to have fine irregularities on surfaces thereof so as to enhance adhesive strength of the current collector to the anode active material, and may be used in any of various forms including films, sheets, foils, nets, porous structures, foams, and non-woven fabrics.

In some embodiments, the anode active material for forming the anode active material layer may be a composite anode active material including a lithium titanium oxide particles and a TiN layer on a surface of the lithium titanium oxide particles, as described above.

When including the composite anode active material, a lithium battery may have improved charging and discharging rate characteristics.

In some embodiments, the TiN layer may have a thickness of from about 1 nm to about 20 nm. For example, the TiN layer may have a thickness of from about 1 nm to about 10 nm, and in some embodiments, may have a thickness of from about 2 nm to about 8 nm.

Due to a strong chemical interaction between the Ti element in the lithium titanium oxide particles and the N (nitrogen) element in the TiN layer on the particles surface, the TiN layer of the composite anode active material may have improved electrical conductivity with a thickness within the above-defined ranges.

In some embodiments, the TiN layer may include rectangular TiN particles. In this regard, referring to FIGS. 1A and 1B, which are scanning electron microscopic (SEM) images of a composite anode active material according to an embodiment of the present invention, at a magnification of ×5,000 and ×20,000, respectively, a TiN layer of the composite anode active material is found to include rectangular TiN particles.

In some embodiments, the anode active material may be the above-described composite anode active material.

In some embodiments, the anode active material layer may also include a binder and a conducting agent.

In some embodiments, the binder strongly binds anode active material particles together and to a current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

In some embodiments, the conducting agent may be used for providing conductivity to the anode. Any electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two thereof.

Amounts of the anode active material, the binder, and the conducting agent may be those levels normally used in lithium batteries. For example, a weight ratio of the anode active material to a mixture of the conducting agent and the binder may be from about 98:2 to about 92:8. A mixing ratio of the conducting agent to the binder may be from about 1:1.0 to about 1:3, but is not limited thereto.

In some embodiments, the cathode 114 may include a current collector and a cathode active material layer disposed on the current collector.

In some embodiments, an Al (aluminum) current collector may be used as the cathode current collector. In addition, similar to the anode current collector, the cathode current collector may also be processed to have fine irregularities on a surface thereof so as to enhance the adhesive strength of the cathode current collector to the cathode active material, and may be used in any of various forms, including a film, a sheet, a foil, a net, a porous structure, foam, and non-woven fabric.

The cathode active material is not specifically limited, and may be any cathode active material commonly used in the art. For example, a compound that allows reversible intercalation and deintercalation of lithium. In some embodiments, the cathode active material may include one or more composite lithium oxides with a metal selected from among Co, Mn, Ni, and a combination thereof. In some embodiments, the cathode active material may include one or more compounds represented by the following formulae, including:

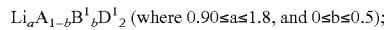
$Li_aA_{1-b}B^1_bD^1_2$ (where $0.90 \leq a \leq 1.8$, and $0 \leq b \leq 0.5$);

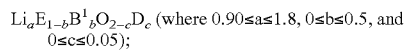
$Li_aE_{1-b}B^1_bO_{2-c}D_c$ (where $0.90 \leq a \leq 1.8$, $0 \leq b \leq 0.5$, and $0 \leq c \leq 0.05$);

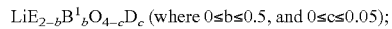
$LiE_{2-b}B^1_bO_{4-c}D_c$ (where $0 \leq b \leq 0.5$, and $0 \leq c \leq 0.05$);

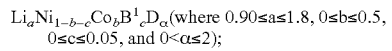
$Li_aNi_{1-b-c}Co_bB^1_cD_\alpha$ (where $0.90 \leq a \leq 1.8$, $0 \leq b \leq 0.5$, $0 \leq c \leq 0.05$, and $0 < \alpha \leq 2$);

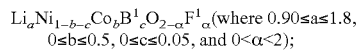
$Li_aNi_{1-b-c}Co_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$);

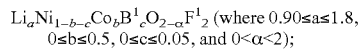
$Li_aNi_{1-b-c}Co_bB^1_cO_{2-\alpha}F^1_2$ (where $0.90 \leq a \leq 1.8$, $0 \leq b \leq 0.5$, $0 \leq c \leq 0.05$, and $0 < \alpha < 2$);

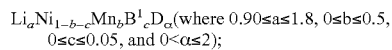
$Li_aNi_{1-b-c}Mn_bB^1_cD_\alpha$ (where $0.90 \leq a \leq 1.8$, $0 \leq b \leq 0.5$, $0 \leq c \leq 0.05$, and $0 < \alpha \leq 2$);

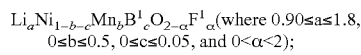
$Li_aNi_{1-b-c}Mn_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$);

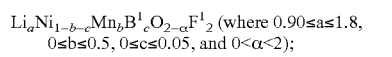
$Li_aNi_{1-b-c}Mn_bB^1_cO_{2-\alpha}F^1_2$ (where $0.90 \leq a \leq 1.8$, $0 \leq b \leq 0.5$, $0 \leq c \leq 0.05$, and $0 < \alpha < 2$);

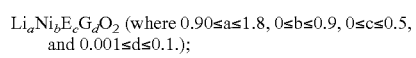
$Li_aNi_bE_cG_dO_2$ (where $0.90 \leq a \leq 1.8$, $0 \leq b \leq 0.9$, $0 \leq c \leq 0.5$, and $0.001 \leq d \leq 0.1$.);

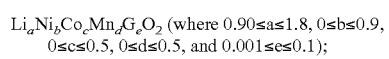
$Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$);

$Li_aNiG_bO_2$ (where $0.90 \leq a \leq 1.8$, and $0.001 \leq b \leq 0.1$);

$Li_aCoG_bO_2$ (where 0.90≤a≤1.8, and 0.001≤b≤0.1.);

$Li_aMnG_bO_2$ (where 0.90≤a≤1.8, and 0.001≤b≤0.1);

$Li_aMn_2G_bO_4$ (where 0.90≤a≤1.8, and 0.001≤b≤0.1.); $LiQO_2$; $LiQS_2$; $LiV_2O_5$; $LiZO_2$;

$LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$.

In some embodiments, the cathode active material may be $LiMn_2O_4$, $LiNi_2O_4$, $LiCoO_2$, $LiNiO_2$, $LiMnO_2$, $Li_2MnO_3$, $LiFePO_4$, and $LiNi_xCo_yO_2$ (where 0<x≤0.15, and 0<y≤0.85).

In the formulae above, A may be selected from the group consisting of nickel (Ni), cobalt (Co), manganese (Mn), and combinations thereof; $B^1$ may be selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of cobalt (Co), manganese (Mn), and combinations thereof; $F^1$ may be selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J may be selected from the group consisting of vanadium (V), chromium (Cr), manganese (Mn), cobalt (Co), nickel (Ni), copper (Cu), and combinations thereof.

In some embodiments, the compounds listed above as cathode active materials may have a coating layer on a surface thereof. Alternatively, a mixture of a compound without having a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. In some embodiments, the coating layer may be formed using any method that does not adversely affect the physical properties of the cathode active material when a compound of the coating element as described above is used. In some embodiments, the coating layer may be formed using a spray coating method, a dipping method, or the like. This is obvious to those of skill in the art, and thus a detailed description thereof will be omitted.

In some embodiments, the cathode active material layer may include a binder and a conducting agent.

The binder strongly binds cathode active material particles together and to a current collector. Non-limiting examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

In some embodiments, the conducting agent may br used for providing conductivity to the cathode. Any electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two thereof.

Amounts of the cathode active material, the binder, and the conducting agent may be those levels normally used in lithium batteries. In some embodiments, a weight ratio of the cathode active material to a mixture of the conducting agent and the binder may be from about 98:2 to about 92:8. In some embodiments, a mixing ratio of the conducting agent to the binder may be from about 1:1.0 to about 1:3, but is not limited thereto.

In some embodiments, the anode 112 and the cathode 114 may be each manufactured by mixing an active material, a binder, and a conducting agent in a solvent to prepare an active material composition, and coating the active material composition on a current collector. N-methylpyrrolidione may be used as the solvent, but the present embodiments are not limited thereto. In some embodiments, an amount of the solvent may be from about 1 part to about 10 parts by weight based on 100 parts by weight of the anode active material or cathode active material.

In some embodiments, a separator may be further disposed between the cathode and the anode, according to the type of the lithium secondary battery. The separator may be a monolayer or a multilayer including at least two layers of polyethylene, polypropylene, polyvinylidene fluoride, or a combination thereof. The multilayer may be a mixed multilayer. In some embodiments, the separator may be a two-layered separator including polyethylene and polypropylene layers, a three-layered separator including polyethylene, polypropylene and polyethylene layers, or a three-layered separator including polypropylene, polyethylene and polypropylene layers.

One or more embodiments of the present embodiments will now be described in detail with reference to the following examples. However, these examples are not intended to limit the scope of the one or more embodiments of the present disclosure. Technical descriptions that are known to one of ordinary skill in the art will be omitted herein.

EXAMPLES

Preparation of Anode Active Material

Example 1

65 g of $Li_2CO_3$ and 174 g of anatase $TiO_2$ having a particle size of about 100 nm were added to 400 g of distilled water, and then subjected to milling using a high-energy ball miller (MiniCer, available from Netzsch, Selb, Germany) to prepare a precursor mixture. The precursor mixture was thermally treated at about 850° C. for about 3 hours to form $Li_4Ti_5O_{12}$ having a spinel structure with an average primary particle diameter of from about 100 nm to about 200 nm and an average secondary particle diameter of about 10 µm.

The $Li_4Ti_5O_{12}$ was mixed with 10 parts by weight of urea based on 100 parts by weight of the $Li_4Ti_5O_{12}$ to obtain a mixture. The mixture was thermally treated in a fabricated stainless steel autogenic reactor at about 700° C. at a pressure of 1 Mpa for about 10 minutes to obtain a composite anode active material with a TiN layer having a thickness of 2 nm on a surface of the $Li_4Ti_5O_{12}$.

The TiN layer included rectangular TiN particles, and had an average particle diameter of about 50 nm.

Example 2

A composite anode active material with a TiN layer having a thickness of about 5 nm on a surface of the $Li_4Ti_5O_{12}$ was prepared in the same manner as in Example 1, except that, instead of 10 parts by weight urea based on 100 parts by weight of the $Li_4Ti_5O_{12}$, 20 parts by weight of urea based on 100 parts by weight of the $Li_4Ti_5O_{12}$ was used.

The TiN layer included rectangular TiN particles, and had an average particle diameter of about 130 nm.

Example 3

A composite anode active material with a TiN layer having a thickness of about 10 nm on a surface of the $Li_4Ti_5O_{12}$ was prepared in the same manner as in Example 1, except that, instead of 10 parts by weight urea based on 100 parts by weight of the $Li_4Ti_5O_{12}$, 30 parts by weight of urea based on 100 parts by weight of the $Li_4Ti_5O_{12}$ was used.

The TiN layer included rectangular TiN particles, and had an average particle diameter of about 200 nm.

Example 4

A composite anode active material with a TiN layer having a thickness of about 20 nm on a surface of the $Li_4Ti_5O_{12}$ was prepared in the same manner as in Example 1, except that, instead of 10 parts by weight urea based on 100 parts by weight of the $Li_4Ti_5O_{12}$, 50 parts by weight of urea based on 100 parts by weight of the $Li_4Ti_5O_{12}$ was used.

The TiN layer included rectangular TiN particles, and had an average particle diameter of about 250 nm.

Example 5

A composite anode active material with a TiN layer having a thickness of about 3 nm on a surface of the $Li_4Ti_5O_{12}$ was prepared in the same manner as in Example 1, except that, instead of 10 parts by weight urea based on 100 parts by weight of the $Li_4Ti_5O_{12}$, 10 parts by weight of thiourea based on 100 parts by weight of the $Li_4Ti_5O_{12}$ was used.

The TiN layer included rectangular TiN particles, and had an average particle diameter of about 70 nm.

Example 6

A composite anode active material with a TiN layer having a thickness of about 8 nm on a surface of the $Li_4Ti_5O_{12}$ was prepared in the same manner as in Example 1, except that, instead of 10 parts by weight urea based on 100 parts by weight of the $Li_4Ti_5O_{12}$, 20 parts by weight of thiourea based on 100 parts by weight of the $Li_4Ti_5O_{12}$ was used.

The TiN layer included rectangular TiN particles, and had an average particle diameter of about 150 nm.

Comparative Example 1

65 g of $Li_2CO_3$ and 174 g of anatase $TiO_2$ having a particle size of about 100 nm were added to 400 g of distilled ethanol, and then subjected to milling using a high-energy ball miller (MiniCer, available from Netzsch, Selb, Germany) to prepare a precursor mixture. The precursor mixture was thermally treated at about 850° C. for about 3 hours to form $Li_4Ti_5O_{12}$ having a spinel structure with an average primary particle diameter of from about 100 nm to about 200 nm and an average secondary particle diameter of about 10 μm.

Manufacture of Lithium Battery

Example 7

The composite anode active material of Example 1, acethylene black (denka black) as a conducting agent, and polyvinylidene fluoride (PVdF) as a binder in a weight ratio of 95:2:3 were mixed with N-methylpyrrolidone (NMP) in an agate mortar to prepare a slurry. The slurry was coated on an aluminum current collector using a doctor blade to a thickness of about 20 μm, dried in a 120° C. vacuum oven for about 30 minutes, and then press-rolled to manufacture an anode plate with an anode active material layer.

After punching the anode plate to a circular shape having a diameter of about 11 mm, the circular anode plate was dried in a 120° C. vacuum oven for about 10 hours for use as a working electrode. A circular metal lithium having a diameter of about 14 mm was used as a counter electrode. A polypropylene separator (Cellgard 3510), and a 1.3M $LiPF_6$ solution in a mixed solvent of ethylene carbonate (EC) and ethylmethyl carbonate (EMC) in a 3:7 volume ratio as an electrolyte were used to manufacture a coin cell half battery having a diameter of about 20 mm.

Example 8

A coin cell half battery was manufactured in the same manner as in Example 7, except that an anode plate manufactured using the composite anode active material of Example 2, instead of that manufactured using the composite anode active material of Example 1, was used as a working electrode.

Example 9

A coin cell half battery was manufactured in the same manner as in Example 7, except that an anode plate manufactured using the composite anode active material of Example 3, instead of that manufactured using the composite anode active material of Example 1, was used as a working electrode.

Example 10

A coin cell half battery was manufactured in the same manner as in Example 7, except that an anode plate manufactured using the composite anode active material of Example 4, instead of that manufactured using the composite anode active material of Example 1, was used as a working electrode.

Example 11

A coin cell half battery was manufactured in the same manner as in Example 7, except that an anode plate manufactured using the composite anode active material of Example 5, instead of that manufactured using the composite anode active material of Example 1, was used as a working electrode.

Example 12

A coin cell half battery was manufactured in the same manner as in Example 7, except that an anode plate manufactured using the composite anode active material of Example 6, instead of that manufactured using the composite anode active material of Example 1, was used as a working electrode.

Comparative Example 2

A coin cell half battery was manufactured in the same manner as in Example 7, except that an anode plate manufactured using the composite anode active material of Comparative Example 1, instead of that manufactured using the composite anode active material of Example 1, was used as a working electrode.

Morphology and Surface Component Analysis of Anode Active Material

Experimental Example 1

Scanning Electron Microscopic (SEM) Test

The anode active materials of Example 1 and Comparative Example 1 were observed by SEM. The results are shown in FIGS. 1A to 1D.

Figure 1B:
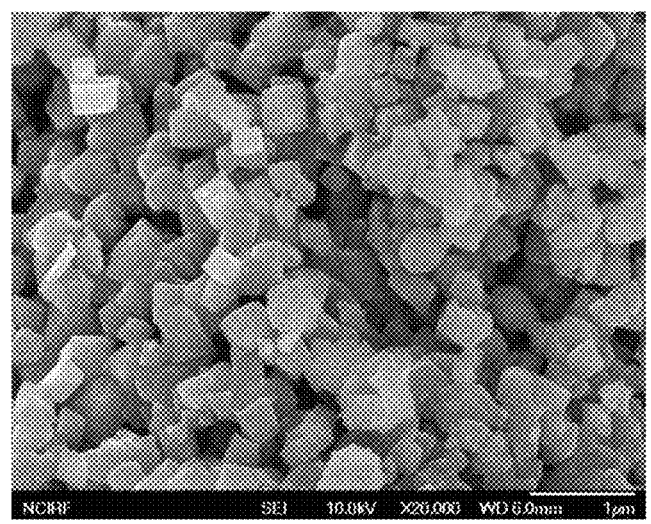
Figure 1C:
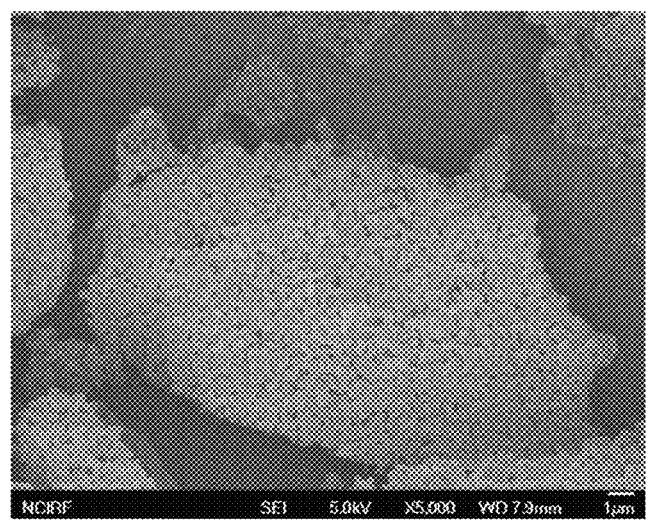
FIGS. 1C and 1D are SEM images of a composite anode active material prepared in Comparative Example 1 at a magnification of ×5,000 and ×20,000, respectively.

Referring to FIGS. 1A and 1C, the anode active materials of Example 1 and Comparative Example 1 were found to be secondary particles agglomerated from primary particles having an average particle diameter of from about 100 nm to about 200 nm.

Figure 1D:
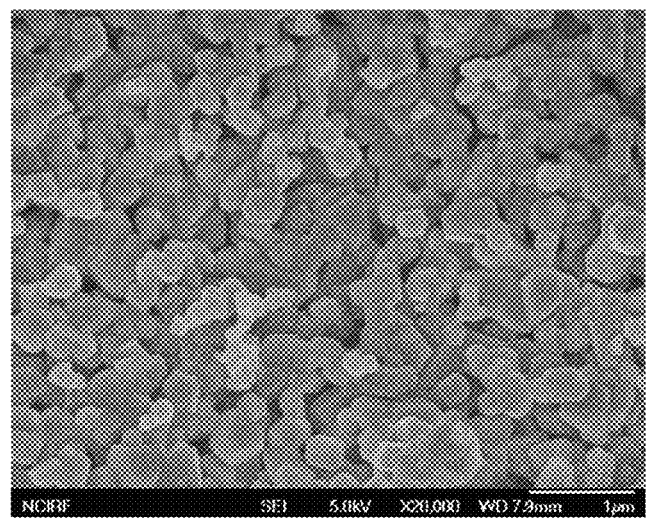

Referring to FIGS. 1B and 1D, particles on the surface of the anode active material of Example 1 were found to be rectangular particles, whereas those of the anode active material of Comparative Example 1 are nearly oval.

These results indicate that the TiN particles in the TiN layer on the surface of the anode active material, i.e., the composite anode active material of Example 1 have rectangular shapes.

Experimental Example 2

Transmission Electron Microscopic (TEM) Test

The TiN particles in the TiN layer of the composite anode active material of Example 2 were observed by TEM at a magnification of ×80,000 and ×800,000. The lithium titanium particles of the composite anode active material of Example 2 and the TiN layer on the surface thereof were observed together by TEM, and only the TiN layer was observed at a magnification of ×800,000 and ×4,000,000. The results are shown in FIGS. 2A to 2C.

Figure 2A:
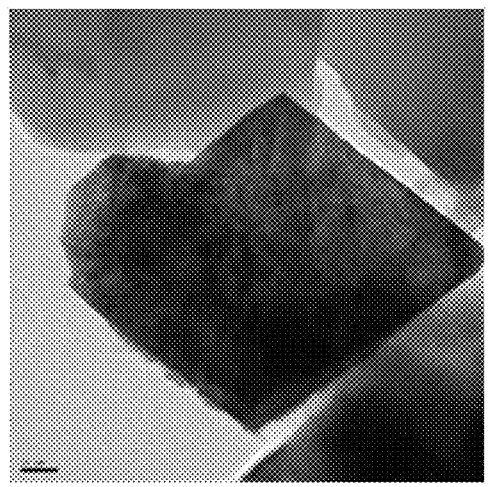
FIG. 2A is a transmission electron microscopic (TEM) image of TiN particles in a TiN layer of a composite anode active material prepared in Example 2 at a magnification of ×80,000.

Referring to FIG. 2A, the TiN particles of the TiN layer in the composite anode active material of Example 2 are found as octahedral particles having an average particle diameter of about 5 nm.

Figure 2B:
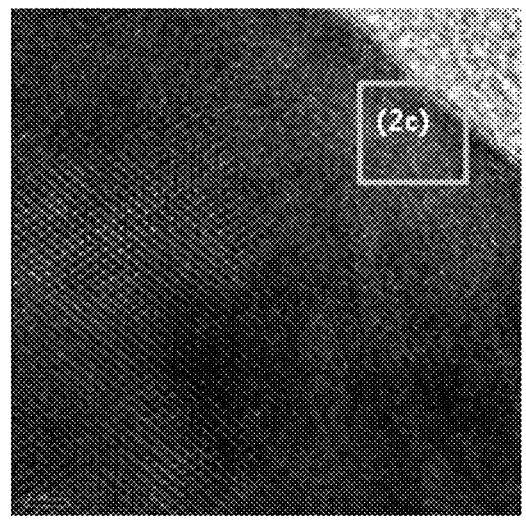
FIG. 2B is a TEM image of a lithium titanium oxide particles and a TiN layer on the lithium titanium oxide particles of the composite anode active material of Example 2 at a magnification of ×800,000.

Referring to FIG. 2B, the lithium titanium oxide of the composite anode active material of Example 2 and the TiN layer on the surface of the lithium titanium oxide were found to have different crystal patterns.

Figure 2C:
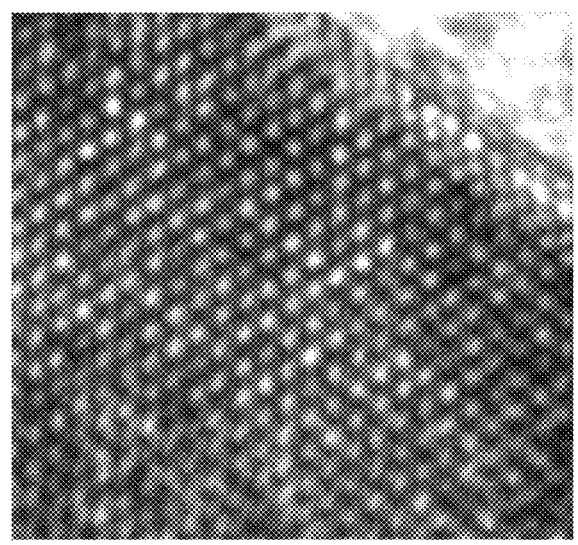
FIG. 2C is a TEM image of the TiN layer of the composite anode active material of Example 2 at a magnification of ×4,000,000.

Referring to FIG. 2C, the crystal pattern of the TiN layer of the composite anode active material of Example 2 has a hexahedral or octahedral rock-salt structure.

Experimental Example 3

X-Ray Photoelectron Spectroscopic (XPS) Analysis

Figure 4:
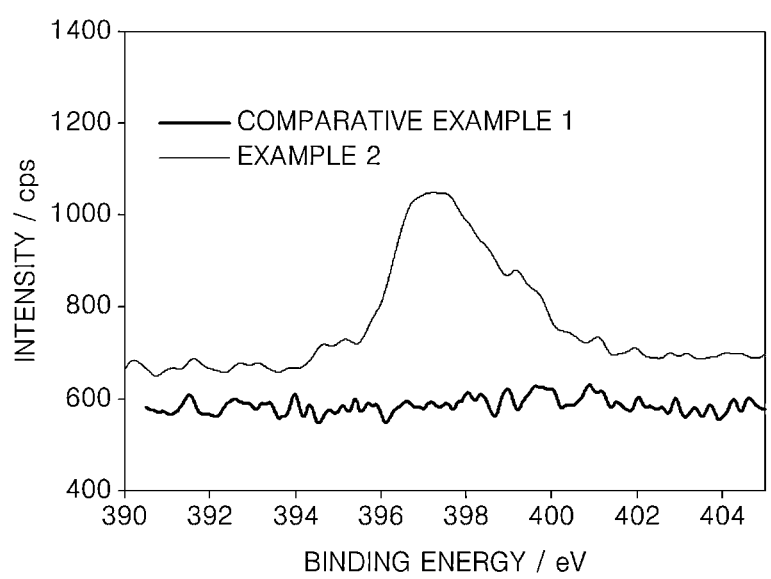
FIG. 4 is a graph illustrating a result of analyzing X-ray photoelectron spectroscopy (XPS) on the composite anode active materials of Example 2 and Comparative Example 1.

The anode active materials of Example 2 and Comparative Example 1 were analyzed by XPS. The XPS measurement was carried out using a device (Sigma probe, available from Thermo Fisher Scientific, Waltham, Mass.) and a monochromatic Al Kα? X-ray radiation with an energy of 1486.6 eV as an X-ray source. The results are shown in FIG. 4.

The composite anode active material of Example 2 with the TiN layer on the lithium titanium oxide surface had a peak of a 1 s orbital level binding energy for nitrogen near 397 eV. Accordingly, the presence of the TiN layer on the surface of the lithium titanium oxide was identified.

Lithium Battery Performance Test

Evaluation Example 1

Evaluation of Charging and Discharging Rate Characteristics

Charging and discharging rate characteristics of the coin cell half batteries of Examples 7, 8, 11 and 12 and Comparative Examples 2 were evacuated after storage at room temperature for about 10 hours.

Based on a theoretical capacitance of 175 mAh/g for $Li_4Ti_5O_{12}$, a 1 C current was set to 175 mA/g, and charging and discharging were performed at a constant current of 0.1 C in a voltage range of 2.5~1.0 V (vs. Li/Li$^+$). That is, initial charging (intercalation of Li$^+$) was followed by discharging (deintercalation of Li$^+$). This cycle was repeated three times with a rest time for 10 minutes between cycles).

Subsequently, while a current level was stepwise increased from 0.1 C to 5 C in a same pattern during charging and discharging (0.1-0.2-0.5-1-2-5 C, 17.5 to 875 mA/g), charging capacities of the coin cell half batteries of Examples 7, 8, 11, and 12, Comparative Example 2 were measured. The results are shown in Table 1 and FIG. 5.

A charging capacity retention rate of each of the batteries was calculated based on the results using Equation 1 below.

Charging capacity retention rate (%)=(Charging capacity at 5 C)/(Charging capacity at 0.1 C)×100.  Equation 1

TABLE 1

| Example | Charging capacity at 0.1 C (mAh/g) | Charging capacity at 5 C (mAh/g) | Charging capacity retention rate (%) |
|---|---|---|---|
| Example 7 | 157.3 | 60.2 | 38.3 |
| Example 8 | 140.1 | 75.9 | 54.2 |
| Example 11 | 157.5 | 64.7 | 41.1 |
| Example 12 | 148.2 | 82.0 | 55.3 |
| Comparative Example 2 | 162.1 | 7.3 | 4.5 |

Figure 5:
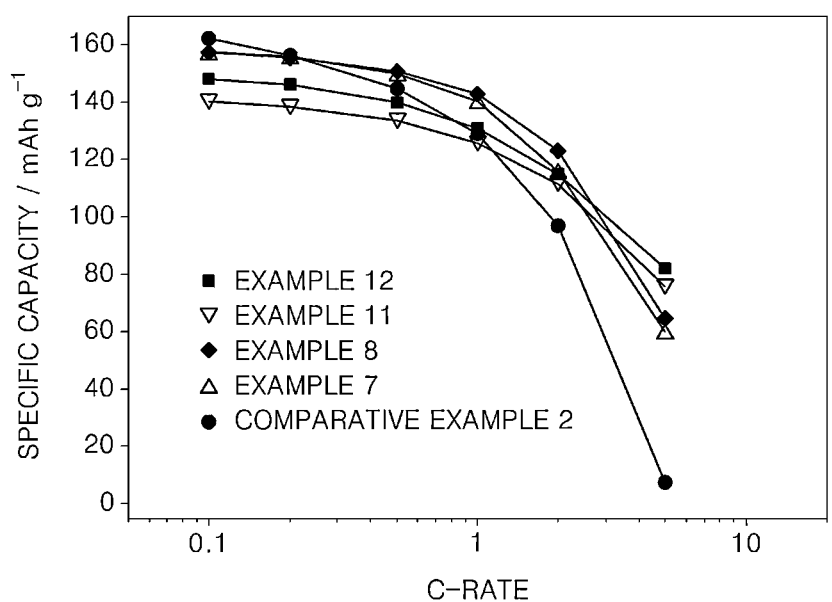
FIG. 5 is a graph illustrating high-speed charging characteristics of lithium batteries according to Examples 7, 8, 11, and 12, and Comparative Example 2.

Referring to Table 1 and FIG. 5, the charging capacity retention rates of the coin cell half batteries of Examples 7, 8, 11, and 12 were 38.3%, 54.2%, 41.1%, and 55.3%, respectively, and the charging capacity retention rate of the coin cell half battery of Comparative Example 2 was 4.5%, as calculated using Equation 1 above.

These results indicate that the coin cell half batteries of Examples 7, 8, 11, and 12 have improved discharging and charging rate characteristics, and in particular, improved charging rate characteristics, as compared with those of the coin cell half battery of Comparative Example 2.

The charging capacity retention rate of the coin cell half battery of Example 11 was about 3% higher as compared with the coin cell half battery of Example 7.

These results indicate that the coin cell half batteries of Examples 11 and 12 have an improvement in discharging and charging rate characteristics, and in particular, in charging rate characteristics, as compared with the coin cell half battery of Comparative Example 2.

As described above, according to the one or more embodiments of the present disclosure, a lithium battery including a composite anode active material that includes a lithium titanium oxide particles and a TiN layer on a surface of the lithium titanium oxide particles, as described above, may have improved charging and discharging rate characteristics due to the TiN layer having high electrical conductivity. A method of preparing the composite anode active material may include: forming a lithium titanium oxide particles; mixing the lithium titanium oxide particles with a urea-based compound to obtain a mixture; and thermally-treating the mixture to yield the composite anode active material with a TiN layer on a surface of the lithium titanium oxide particles. The method of preparing the composite anode active material is less costly, and is easy to perform.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite anode active material comprising: lithium titanium oxide particles; and a TiN layer on a surface of the lithium titanium oxide particles, wherein the TiN layer has a thickness of from about 1 nm to about 20 nm and comprises TiN particles, said TiN particles having an average particle diameter of from about 20 nm to about 250 nm.

2. The composite anode active material of claim 1, wherein the TiN layer comprises substantially rectangular TiN particles.

3. The composite anode active material of claim 1, wherein the TiN particles comprise substantially hexahedral or octahedral particles.

4. The composite anode active material of claim 1, wherein the lithium titanium oxide particles have a spinel structure.

5. The composite anode active material of claim 1, wherein the lithium titanium oxide particles are represented by Formula 1 below:

$$Li_{4+x}Ti_{5-y}M_zO_{12-n}$$ Formula 1 wherein, in Formula 1 above, $-0.2 \leq x \leq 0.2$; $-0.3 \leq y \leq 0.3$; $0 \leq z \leq 0.3$; $-0.3 \leq n \leq 0.3$; and M is selected from the group consisting of lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

6. The composite anode active material of claim 1, wherein the lithium titanium oxide particles comprise secondary particles agglomerated from primary particles.

7. The composite anode active material of claim 6, wherein the secondary particles have an average diameter of from about 1 μm to about 30 μm.

8. A lithium battery comprising:
a cathode;
an anode including the composite anode active material of claim 1; and
an electrolyte disposed between the cathode and the anode.

9. The lithium battery of claim 8, wherein the TiN layer has a thickness of from about 1 nm to about 10 nm.

10. The lithium battery of claim 8, wherein the TiN layer has a thickness of from about 2 nm to about 8 nm.

11. The lithium battery of claim 8, wherein the TiN particles have an average particle diameter of from about 50 nm to about 200 nm.

12. The lithium battery of claim 8, wherein the TiN particles have an average particle diameter of from about 50 nm to about 150 nm.

13. The lithium battery of claim 8, wherein the TiN particles have an average particle diameter of from about 50 nm to about 150 nm.

* * * * *